UNITED STATES PATENT OFFICE.

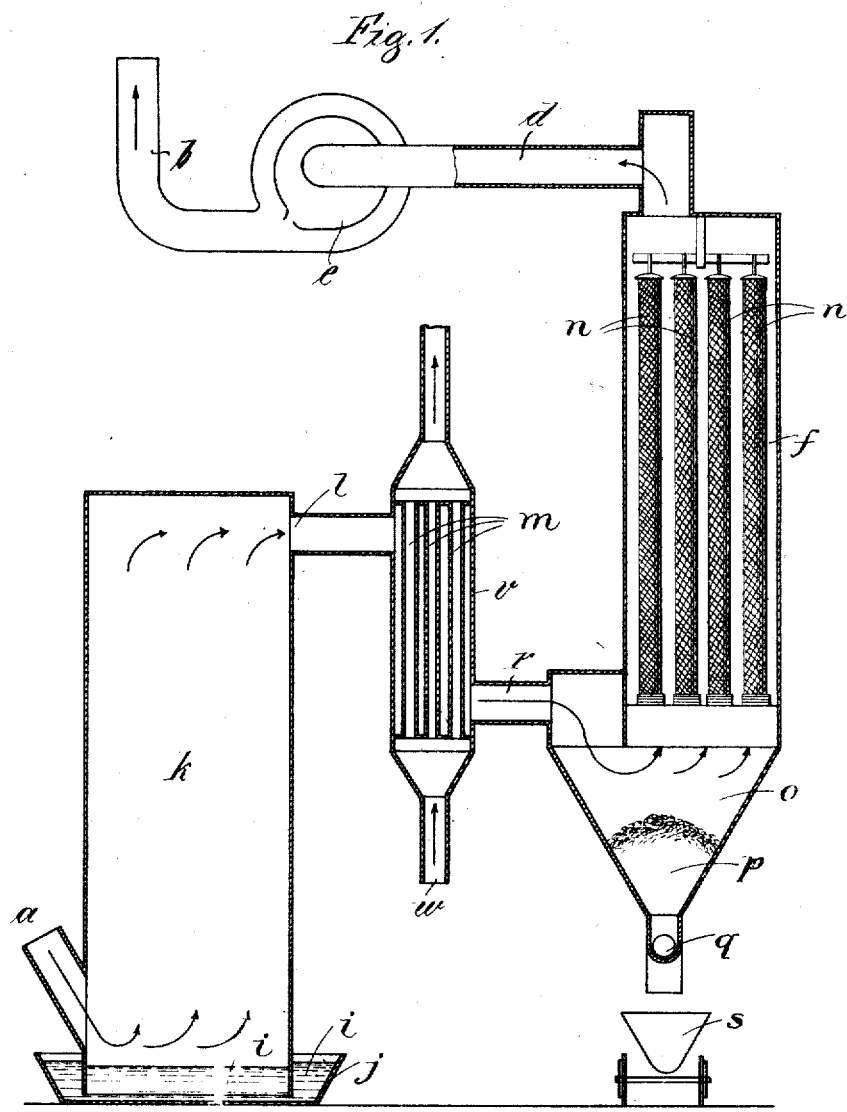

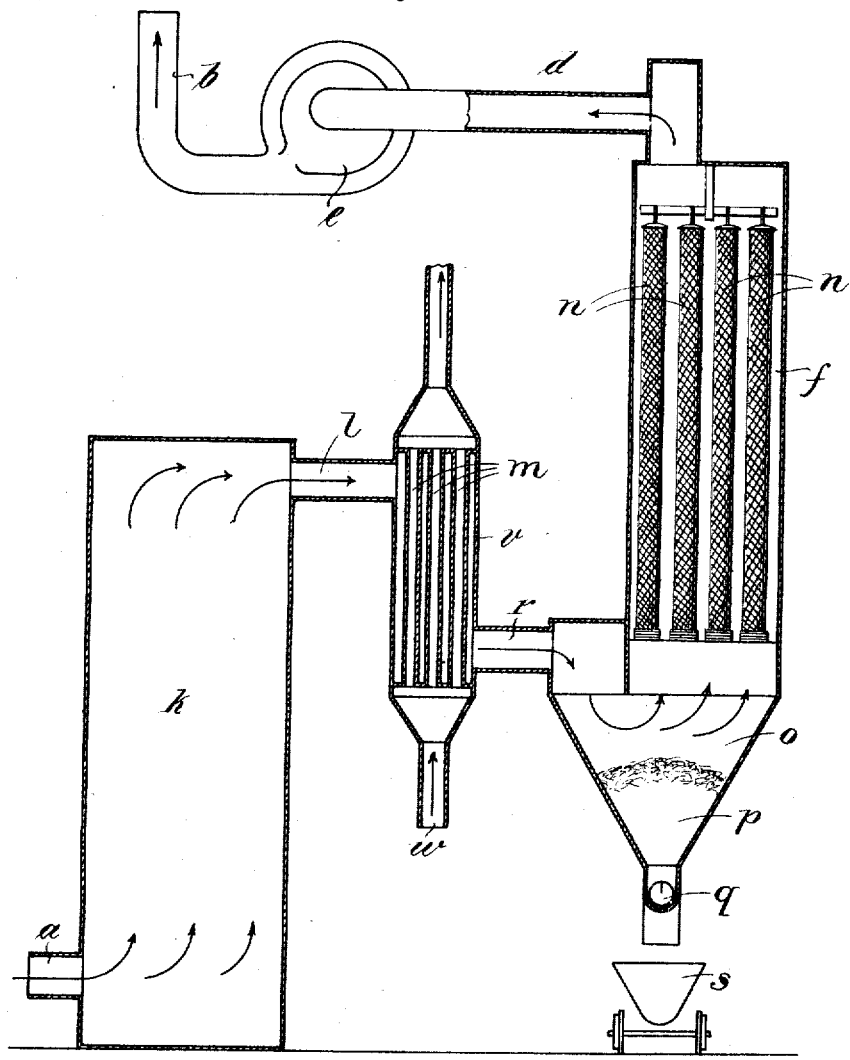

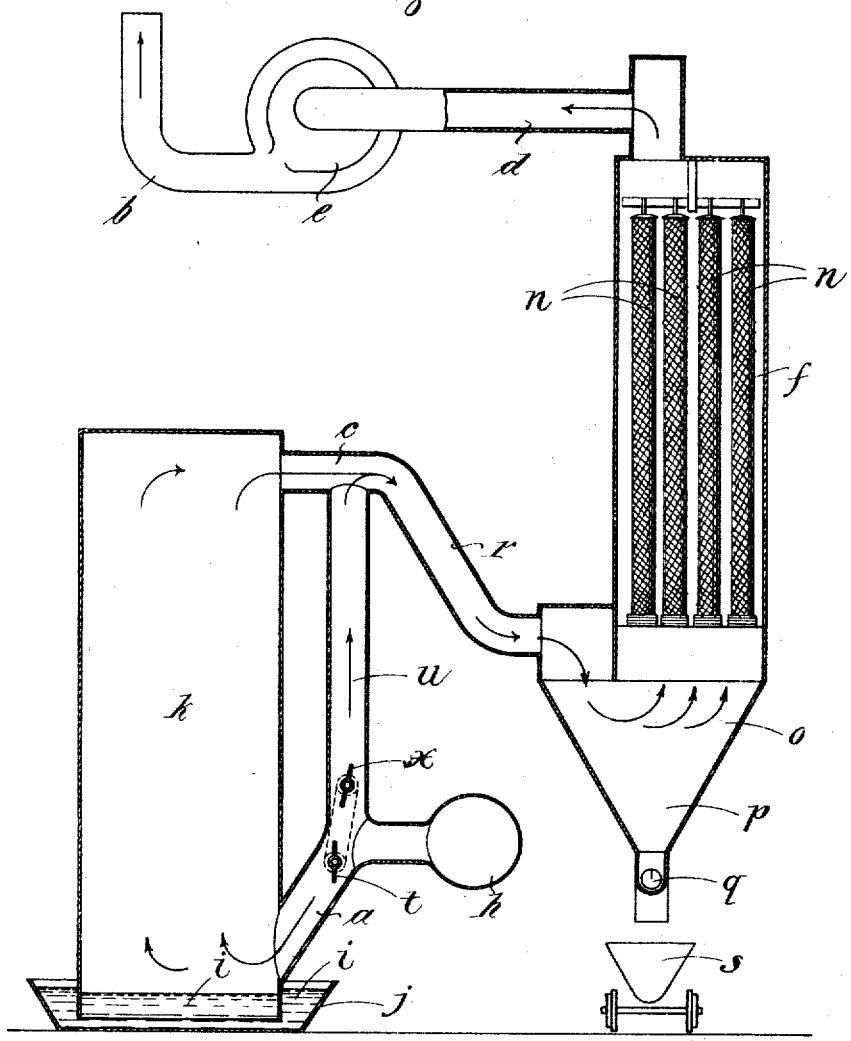

FRIEDRICH MÜLLER, OF BREBACH-ON-THE-SAAR, OTTO JOHANNSEN, OF NEUFECH-
INGEN, AND PETER PAPE, OF BREBACH-ON-THE-SAAR, GERMANY, ASSIGNORS TO
COMPANY RUDOLPH BÖCKING & CIE. ERBEN STUMM- HALBERG UND RUD. BÖCKING
G. M. B. H., OF HALBERGERHÜTTE, NEAR BREBACH, GERMANY.

PROCESS FOR THE FILTRATION OF FURNACE-GASES.

1,022,496.  Specification of Letters Patent.  Patented Apr. 9, 1912.

Application filed January 5, 1911. Serial No. 601,024.

*To all whom it may concern:*

Be it known that we, FRIEDRICH MÜLLER, a subject of the King of Prussia, and resident of 5 Provinzialstrasse, Brebach-on-the-Saar, Germany, mining director, OTTO JOHANNSEN, a citizen of the free town of Lübeck, and resident of 14 Scheidterstrasse, Neufechingen, Germany, chemist, and PETER PAPE, a subject of the King of Prussia, and resident of 8 Am Halberg, Brebach-on-the-Saar, German Empire, engineer, have jointly invented an improved Process for the Filtration of Furnace-Gases, of which the following is a specification.

This invention relates to an improved process for the dry filtration of furnace gases.

In foundries and similar works, in which the furnace gases are used for heating purposes or for the driving of gas engines, the necessary purification has hitherto been carried out by bringing the furnace gases with their solid constituents in contact with water and passing the water-laden gases through separating means or the gases have been separated from their solid constituents by centrifugal force. In order however to attain a somewhat useful degree of purity by these processes, the expenditure of energy and water entails extraordinary high cost. The greatest difficulty however is in overcoming the considerable masses of water and mud. Attempts have already been made to purify the furnace gases by dry methods, but hitherto such attempts have not produced any suitable result. It is to be noted that the condition of the furnace gases coming from the blast furnace and which contain moisture and attain high temperatures are liable to very considerable variations, in that on charging the oven the temperature suddenly sinks very low and at the same time the degree of moisture is raised, while on the other hand shortly before a new charge or stopping of the works, for example on non-working days, the temperature and the dryness of the furnace gases is very high. In view of these disadvantages the application of metallic filters presents itself. It has however been found that a sufficient cleaning of the gases cannot be obtained even with mesh work of the finest degree and that the metallic filters are easily subjected to destruction. Further, superposed hurdle devices carrying rubble for the purpose of filtration are liable to choking and therefore offer too great resistance. Besides this, canals or passages may be formed in the rubble through which the gas can pass without being cleaned. According to this invention the use of such material is dispensed with. The improved process admits of the use of fibrous material of vegetable or animal, origin, although in view of previous experience in this sphere, such material must really of itself be considered of little value. It has however been found that by the use of this fibrous material in the process to be hereinafter described, a degree of purification can be obtained, which was hitherto considered wholly impossible, as it was not even attainable by the use of the finest metal gauze. The use of fibrous material separates the solid constituents of the gases, even the most minute, so that even without arranging filters behind one another and without the use of a special apparatus, such a degree of purification may be obtained that the quantity of foreign matter in the gases can be brought as low as 5 mg per cubic meter.

It is essential that the filter itself should not be subjected to the herein referred to variations in the condition of the furnace gases. The conditions must be equalized and this is obtained by cooling the gases.

The cooling of the furnace gases in combination with filtration is not new, but according to the present process the gases are cooled down to the dew-point. It is comparatively easy to attain this degree of cooling and this cooling process does not necessitate any particular superintendence. The dew-point gives a limit which it is proportionately simple to keep to. The gases from the different blast furnaces are conducted to the cooling apparatus, where they undergo a cooling down to the dew-point, so that an equalization takes place. If however the cooled gases were now directly passed to the filter, the latter would very soon be choked and rendered useless owing to the fact that the temperature of the dew point is, in most cases, considerably higher than the atmospheric temperature, and owing to the fact that the gases coming into contact with the filter (which it at atmospheric temperature) would be still further cooled and cause part of the water vapor contained therein to be condensed, which condensed water would render the dirt and filter material moist and cause the dirt to cling to the filter material. If, on the other hand, the gases have been regulated to a temperature of about 100° C., which may readily be effected without much difficulty in a suitable apparatus, then again the difficulty would be presented that the fibrous material would be destroyed. It is therefore essential that the temperature be between these two limits.

According to this invention, the process is based upon the attainment of the dew-point and then subjecting the gases to a restricted heating process, in order to keep the temperature within the limits hereinbefore referred to, and in practice it is of course easily possible not only to keep within these limits, but also to obtain such a temperature within these limits, as appears most suitable, which is somewhat about 20° above the dew-point. Hereby the choking of the filter is prevented, but it has been found that in spite of the fact that the gases are brought below the critical temperature, hereinbefore mentioned, the process cannot be used with entire safety as the filter material is rapidly rendered useless, in that the gases are too dry and therefore render the filter very brittle. In order to obviate this difficulty, the gas before passing to the filter is preferably moistened but not to too great an extent, but only to such a degree that the flexibility and pliability of the filter may be retained. The damping process or the retaining of a certain degree of moisture in the gas therefore prevents the filter material from being dry-baked. The damping process is preferably carried out in the cooler by enabling the gas to come in contact with water. The large expenditure of heat necessary for the evaporation gives a good and uniform cooling and retains the necessary degree of moisture required without the formation of mist which would choke the filter.

The dew point of the gases is dependent, of course, on the amount of moisture in the charge and on the humidity of the furnace gases evolved, and varies constantly within certain limits. By bringing the gases into contact with moisture, the dew point of the latter is of course influenced, but under normal conditions, the influence is very insignificant as compared with the quantity of water already present in the gases. If, however, as occasionally takes place for short periods of time, the gases becoming very hot and dry, say owing to furnace interruptions, the gases then take up more moisture owing to the more rapid evaporation of the water, so that the dew-point is again brought up to the calculated average. The following figures however give the average conditions in the Halberger foundry in Germany per ton of pig iron:—
Coke used—about 1300 kg.
Ore yielding about 31% pig iron=3230 kg.
Water contained in Halberger coke 8–9%.
Water contained in Heinitz coke 12–15%.
Water contained in ore 8–10%.
Water contained in Halberger coke 8–9%.
4 cu. m. per kg.
Gas evolved from Heinitz coke, about 3.8 cu. m. per kg.
Water contained in charge, using Halberger coke:—
1300 kg. coke×9%+3230 kg. ore×10%= 440 kg.
Gas evolved=1300×4=5200 cu. m.
Moisture in gas=

$$\frac{440000}{5200} = 85 \text{ gr. per cu. m.}$$
Dew point therefore=50° C.
Water contained in charge, using Heinitz coke:—
1300 kg. coke×15%+3230 kg. ore×10% =518 kg.
Gas evolved=1300×3.8=5000 cu. m.
Moisture in gas=

$$\frac{518000}{5000} = 103 \text{ gr. per cu. m.}$$
Dew point therefore=55° C.
The following figures are taken from the Siegen foundry, Westphalia, Germany:—
Water contained in Westphalia coke= 3–5%.
Water contained in ore=0–5%.
Water contained in lime=3–5%.
Ore yielding about 33% pig iron=900 kg. +about 10% lime.
Total moisture in charge=1200 kg. coke× 105 5%+900 kg. ore×5%+300 kg. lime×5% =225 kg.
Gas evolved 4.2 cu. m. per kg. coke=1200 ×4.2=5000 cu. m.
Moisture contained in gas=225000/5000= 45 gr. per cu. m.
Dew point therefore equals 37° C.

In order that the invention may be more clearly understood, reference is made to the accompanying drawings, whereon three different forms of apparatus for carrying out the invention are illustrated.

Figure 1 is a sectional elevation of the filtering apparatus. Fig. 2 is a view similar to Fig. 1, but in which the damping process is dispensed with. Fig. 3 is a similar view of the Figs. 1 and 2, showing means whereby only a part of the gases may be passed through the cooler.

Referring to Fig. 1 of the drawings, the furnace gases from the different blast furnaces enter the cooler k by way of a tube a, the cooler being provided with a water-seal i contained in a trough j in which the cooler k stands. On the drawing the arrows indicate the direction of the gases which, it will be seen, may contact with the upper surface of the water $i$ and are thereby cooled and at the same time supplied with the necessary amount of moisture. After leaving the cooler, the gas which has now been cooled to about the dew-point passes through a conduit $l$ into a heater $v$ which comprises a plurality of tubes $m$, to which by means of a pipe $w$ steam, hot air or the like may be conducted for heating purposes. The gases from the conduit $l$ surround the tubes $m$ and the temperature of the gases is hereby somewhat raised and it is found that incrustation of the tubes does not take place and that the tubes are only very lightly covered with dust. After the subsequent heating of the gases in this way, the gases are conducted by way of a tube $r$, to a filtering chamber $f$, in which the gas passes through fibrous material $n$ of vegetable or animal origin and preferably in the form of the usual tubular fabric. The dust particles in the gas are thereby retained by the fibrous material and subsequently fall into the lower part $o$ of the chamber $f$, where the dust $p$ is removed by means of a conveyer $q$ into trucks or the like $s$ the clean gas passes through the tube $d$ into a fan $e$ and from there into the piping $b$ for use. The gas is drawn through the apparatus by means of the exhauster $e$.

If the gas itself should have a sufficiently high degree of moisture, so that there is no possibility of the filter being destroyed, then the moistening process may be dispensed with as shown at Fig. 2. Further description thereof is unnecessary as otherwise the operation is identical with that of Fig. 1.

Instead of using reheating apparatus, as shown in Figs. 1 and 2, the arrangement may be in the form shown in Fig. 3, in which only a part of the gases requires to be cooled. The gases are led from the furnace to the collecting tube $h$ and pass from thence by way of the tube $a$ and through a suitable valve $t$ to the cooler $k$ and through a valve $x$ to a branch pipe $u$, which communicates with the gases from the cooler $k$ at the point $c$, so that part of the gases is passed through the cooler $k$ and cooled therein, while the remainder of the gases passes direct to the point $c$ and there mixes with the cooled gas, so that the desired temperature intermediate the hereinbefore described limits is attained.

We claim:

1. A process for the dry filtration of furnace gases, which comprises, firstly, cooling the gases to the dew point, thereafter somewhat reheating the gases and then passing the gases through filter material.

2. A process for the dry filtration of furnace gases, which consists, firstly, in cooling the gases to the dew-point and at the same time moistening the gases, thereafter somewhat reheating the gases and then passing the gases through filter material.

3. A process for the dry filtration of furnace gases, which comprises, firstly, cooling a part of the gases to the dew point, thereafter somewhat reheating the cooled gases by mixing with uncooled gases and then passing the gases through filter material.

In witness whereof we have hereunto set our hands in the presence of two witnesses.

FRIEDRICH MÜLLER.
OTTO JOHANNSEN.
PETER PAPE.

Witnesses:
  MATFRIED FRIEBAND,
  JOHANN MÜLLER.